Jan. 2, 1968    R. F. ENGELMANN    3,361,447
CLAW LATCH FOR THREE-POINT HITCH
Filed Dec. 20, 1965
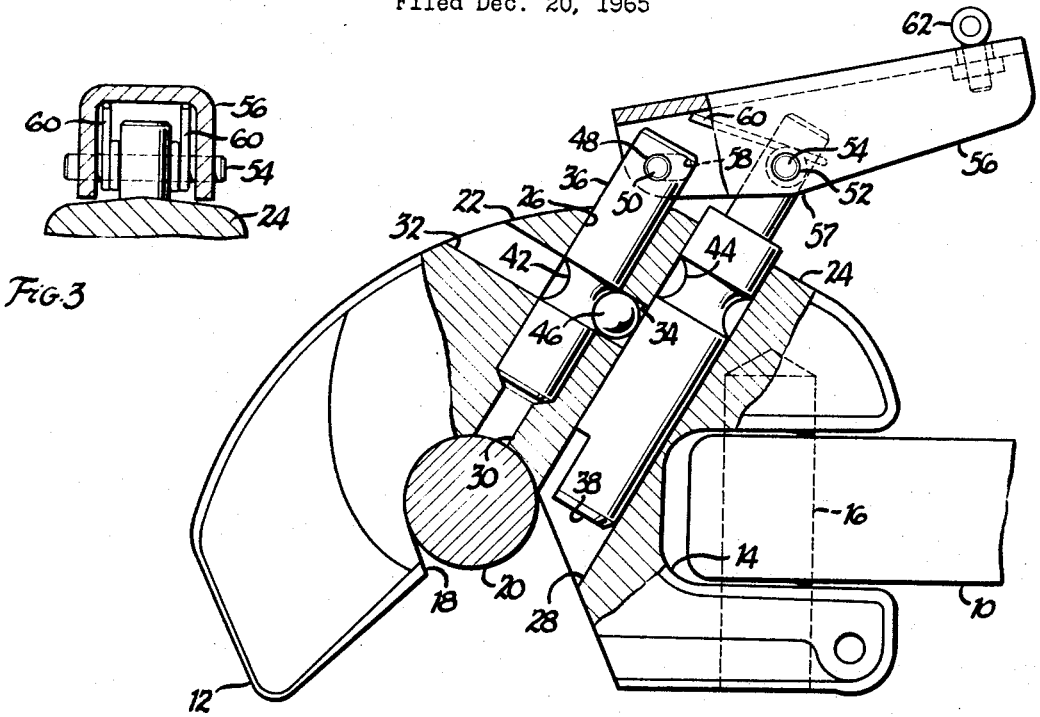
FIG. 3
FIG. 1
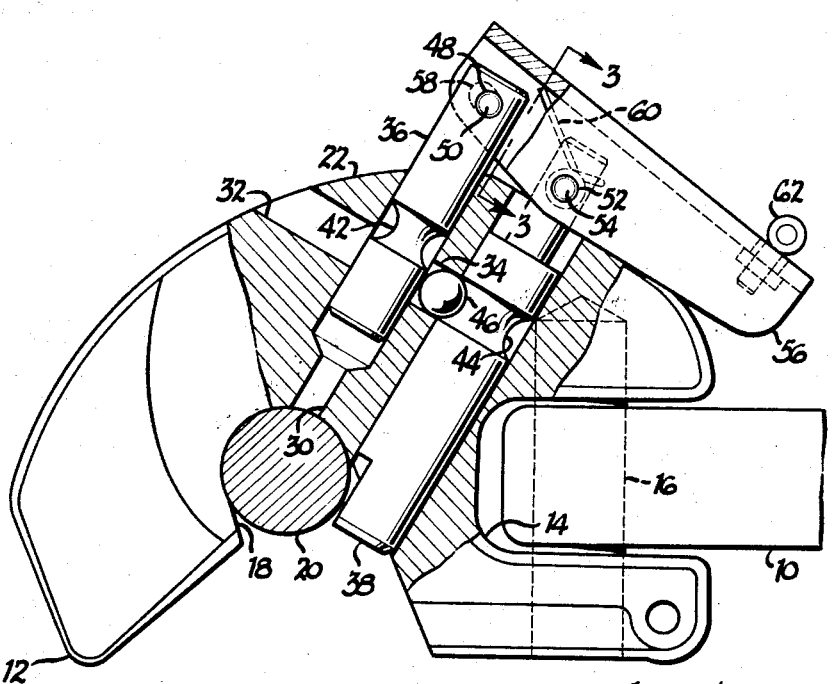
FIG. 2
Inventor
ROGER F. ENGELMANN

United States Patent Office 3,361,447
Patented Jan. 2, 1968

3,361,447
CLAW LATCH FOR THREE-POINT HITCH
Roger F. Engelmann, Racine, Wis., assignor to J. I. Case Company, Racine, Wis., a corporation of Wisconsin
Filed Dec. 20, 1965, Ser. No. 514,959
3 Claims. (Cl. 280—504)

ABSTRACT OF THE DISCLOSURE

A claw-like latching device for connecting the upper link of a three-point hitch to an implement hitch pin. The device includes grooved plunger members slidable in adjacent bores, and ball means engagable in the grooves for holding one of the members in a latched or unlatched position. A lever connects the plunger members for positioning the members for latching and unlatching of the hitch pin.

---

The present invention relates to agricultural implements and more particularly to hitch devices for connecting or coupling an implement to a tractor. Specifically, the invention is a latching device for connecting the upper link of a three point hitch to the implement hitch pin.

The three point hitch has been used successfully in the agricultural industry and new and improved hitches and coupling devices are being sought with the introduction of the newer and better implements. A typical hitch and coupling device, including an upper link, is disclosed in U.S. Patent No. 2,844,397, issued to W. H. Du Shane.

One of the desired features in a three point hitch is to have a "quick and easy" attachment to the implement. A more important feature is to have a hitch which is "quick and easy" to attach and additionally to have a hitch that does not uncouple accidentally. Prior devices which latched the upper link of a three point hitch to the implement mast or hitch pin were susceptible of accidental uncoupling, which could result in injury to machinery and possibly to the operator. This invention is designed to prevent such uncoupling.

The main object of this invention is to provide an improved latching or coupling device for the upper link of a three point hitch.

Another object is to provide a claw hitch for the upper link which is always returned to the latched position.

A further object is to provide a latching device which can be quickly and easily connected to an implement.

An additional object is to provide a latching device which will insure against accidental uncoupling of the hitch.

Additional objects and advantages will become apparent from the following description and the annexed drawings; in which:

FIGURE 1 is a side view of the device in an unlatched position, parts being broken away;

FIG. 2 is a side view of the device in a latched position, parts being broken away; and FIG. 3 is a view taken on the line 3—3 of FIG. 2.

As stated above, this invention is a latching device for connecting the upper link of a three point hitch to the hitch pin of an implement. A typical disclosure of a three point hitch is shown in U.S. Patent No. 2,844,397, this patent showing a hitch which includes the lower links and an upper link. Specifically, this invention comprises the claw latch which connects with the implement hitch pin.

As seen in FIGS. 1 and 2, a portion of an upper link 10 is shown and it is believed not necessary to further describe a typical three point hitch, the hitch being shown and described in the above-mentioned patent. The claw latch comprises a body 12 having a recessed portion 14 for insertion of upper link 10, body 12 being connected and pivotally held in place on the upper link by a pin 16. The claw latch body 12 is normally held rather rigidly in place on the implement hitch pin, however, the upper link 10 and the body 12 must be so constructed so as to pivot or swivel on a pin, for instance, when the tractor or prime mover is turning a corner. Body 12 has a recessed portion 18 which is so constructed and designed to fit snugly on an implement hitch pin 20. Body 12 is called a "claw latch" because of the claw type construction and it has a rounded portion 22 on the upper and rear sides thereof. Body 12 also has a straight portion 24 on the upper side for purposes to be described.

Body 12 defines a bore 26 running from the top side of the body to the recess 18 and, spaced from bore 26 is a bore 28 generally parallel to bore 26. Bore 26 intersects with a bore 30 at a predetermined distance from recess 18 for purposes to be described. Body 12 also defines a bore 32 which is generally perpendicular to bore 26. A bore 34, which may be termed a continuation of bore 32, extends from bore 26 to bore 28.

A first member or plunger 36 is slidably supported in bore 26 in body 12 and a second member or plunger 38 is slidably supported in bore 28 in body 12. Members 36 and 38 are cylindrical in construction to provide a readily slidable plunger action when being moved in their respective bores. The first cylindrical member 36 has a recess or groove 42 near the center thereof and the second cylindrical member 38 has a recess or groove 44 near the center, grooves 42 and 44 encircling their respective members. Within body 12 and touching or engaging both members 36 and 38, is a ball 46.

It can be seen in FIG. 1 that ball 46 is in bore 34, is seated in groove 42 and is also touching the surface of member 38. In this position of the ball 46 and member 38, the implement hitch pin 20 is free to be moved out of recess 18. In FIG. 2, as the member 38 is moved in a downwardly direction, ball 46 is also urged in the same direction but it cannot be moved out of recess 42 until recess 44 in member 38 is moved substantially into alignment with ball 46. Since ball 46 is contained in bore 34, the ball slides in bore 34 as it moves from groove 42 to groove 44 during the time that member 38 is being moved to the latching position. In the unlatched position, bore 32, bore 34, groove 42 and ball 46 are in alignment. In the latched position, bore 32, bore 34, ball 46 and groove 44 are aligned, this being due to the construction such that when member 36 is moved upwardly, member 38 is moved downwardly.

Referring to FIG. 1, it can be seen that ball 46 is in a position which is aligned with bore 32. This is one of the ways of inserting ball 46 into bore 32 and thus into body 12 for positioning the ball to be engageable with members 36 and 38. Another way to insert ball 46 in its proper position is to turn the body 12 upside-down and insert the ball into bore 28 before member 38 is placed therein. Member 36 has near one end thereof, a bore 48 and member 38 has likewise in a similar position, a bore 52. A pin 50 is placed in bore 48 and a pin 54 in bore 52.

Pins 50 and 54 are somewhat longer than the diameter of members 36 and 38 for purposes now to be described.

A connecting means or lever 56 is attached to members 36 and 38 and is pivotally connected by means of pins 50 and 54. Lever 56 is so constructed and designed to have a portion 57 engage and ride on the flat portion 24 of body 12. The geometry of the lever 56 and body 12 is so designed that whenever lever 56 is raised or lowered, members 36 and 38, being generally parallel, are free to slide in bores 26 and 28. Lever 56 near one end thereof has an elongated opening or lost motion connection 58 which is adapted to pivot on pin 50, and to allow a slight amount of movement of lever 56 so as to prevent binding of members 36 and 38 as they are moved in bores 26 and 28.

A return means or spring 60 is pivotally connected to pin 54 and engages the underside of lever 50 as seen in FIG. 3. Spring 60 is placed on pin 54 so as always to exert a force and to bias the lever 56 in a downward direction. Lever 56 also has a ring or pull pin 62 to aid the operator in moving the lever in an up-and-down direction. A normal position of lever 56 is in the latched position because of the return spring bias and the position of ball 46 in bore 34 and seated in groove 44.

As noted above, FIG. 1 shows the position of the various parts of the claw latch in the unlatched position. Lever 56 is pulled to the open or unlatched position with spring 60 bearing on the lever and always tending to return the lever to a downward direction. Members 36 and 38 are then positioned so that body 12 can be moved off hitch pin 20. Ball 46 is engaged in recess 42 of member 36 and also engaged with a straight portion of member 38.

FIG. 2 shows the claw latch in the latched or coupled position, it being noted that member 38 is now in a position engaging with hitch pin 20. Handle 56 is in the lowered or downward position and spring 60 is holding member 38 in a locked condition. Ball 46 is now engaged with recess 44 and also engaged with a straight portion of member 36. As handle 56 in FIG. 2 is moved upwardly its pivots on pin 54 and member 36 is moved downwardly toward pin 20. During this initial movement member 38 cannot move upwardly as ball 46 is maintained in bore 34 which connects bores 26 and 28. As member 36 continues to move downwardly, groove 42 aligns with bore 34 and ball 46 is free to move from groove 44 to groove 42. Continued raising of lever 56 forces ball 46, by reason of pressure from the edge of groove 44, along bore 34 and into groove 42. The handle is further raised and member 38 is moved upward while member 36 is seated in its lower position, so that ball 46 is pushed into groove 42 and is kept there by member 38. As the handle 56 is lowered for latching, member 38 moves downwardly prior to any movement of member 36 because ball 46 is maintained in bore 34 and groove 42 until groove 44 again aligns with bore 34. Thus it is seen that gravity has minimum effect on the movement of ball 46 sliding along bore 34. Ball 46 is always in contact with either groove 42 and the surface of member 38, or groove 44 and the surface of member 36, except when both grooves are aligned with bore 34, at which time the ball is movable along the bore. As stated, lever 56 is always urged downwardly by reason of spring 60 and ball 46, and the pin 20 is kept captured until lever 56 is moved upwardly. The construction of the latching device is such that lever 56 must always be pulled in the upward direction to overcome the biasing effect of spring 60 and allow unlatching of the claw from the hitch pin. While the specific embodiment has been described with lever 56 in the upward direction, the latching device could be operative in an inverted position from that shown. This is because member 38 is always urged into a latched position which is an additional advantage over other types that may be accidentally tripped. Ball 46 and members 36 and 38 are of a material which allows dry operation of the device, and this is important because the various parts need not be lubricated to provide for ease of operation.

It is believed that the construction and operation of the claw latch or latching device is adequately shown and described and will enable those skilled in the art to thoroughly understand the invention. It is to be understood that variations in the construction and details will doubtless occur to those skilled in the art and that different arrangements of the slidable members 36 and 38 could be adapted for insuring a lock of the claw body and the implement hitch pin. These and other variations are considered to be within the scope of this application and the invention is not to be taken as limited in any manner except as defined in the annexed claims.

What is claimed as new and desired to be secured by Letters Patent of the United States is:

1. A latching device for connecting the upper link of a three point hitch to an implement pin, said device including a claw-like body having spaced jaws defining an open-sided recess therebetween and formed to fit over said pin, a first grooved member slidably supported in said body, a second grooved member slidably supported in said body and laterally spaced from said first member and movably enterable into said recess in a lower position to entrap said pin and movable to an upper position to release said pin, a passageway in said body between said members, lever means connecting said first and second members for actuating said first and second members in sliding relationship, and means in said passageway selectively engageable in the grooves of said first and second members such that a portion of said engageable means is engaged in the groove of said first member and retained therein by the lower portion of said second member when said second member is in said upper position, and a portion of said engageable means is engaged in the groove of said second member and retained therein by the lower portion of said first member when said second member is in said lower position.

2. A device in accordance with claim 1 wherein said engageable means is a ball.

3. A device in accordance with claim 1 including spring return means pivotally connected to said second member and engageable with said lever connecting means for biasing said connecting means and said second member to the lower position.

References Cited

UNITED STATES PATENTS

| | | | |
|---|---|---|---|
| 1,198,139 | 12/1916 | Lyon | 294—83 |
| 1,651,607 | 12/1927 | Kurtz | 294—83 X |
| 2,844,397 | 7/1958 | Du Shane | 287—60 |
| 3,045,634 | 7/1962 | Dorsett | 294—83 X |

BENJAMIN HERSH, *Primary Examiner.*

LEO FRIAGLIA, *Examiner.*

C. C. PARSONS, *Assistant Examiner.*